United States Patent [19]

Koch et al.

[11] 4,259,677
[45] Mar. 31, 1981

[54] METHOD AND APPARATUS FOR RECORDING THE COMPRESSION PRESSURE OF INTERNAL COMBUSTION ENGINES

[75] Inventors: Peter H. Koch, Frankfurt am Main; Bernhard H. Friebe, Runkel, both of Fed. Rep. of Germany

[73] Assignee: VDO Adolf Schindling AG, Frankfurt am Main, Fed. Rep. of Germany

[21] Appl. No.: 92,275

[22] Filed: Nov. 8, 1979

[30] Foreign Application Priority Data

Nov. 9, 1978 [DE] Fed. Rep. of Germany ....... 2848613

[51] Int. Cl.³ .................. G01D 15/16; G01D 9/00; G01M 15/00
[52] U.S. Cl. ...................... 346/124; 346/33 TP; 73/115
[58] Field of Search ......................... 346/1, 3–6, 346/33 TP, 113, 124; 73/115

[56] References Cited

U.S. PATENT DOCUMENTS

| | | | |
|---|---|---|---|
| 347,088 | 8/1886 | Brown | 346/5 |
| 619,049 | 2/1889 | Paige | 346/113 X |
| 897,311 | 9/1908 | Spencer | 346/113 X |
| 1,117,470 | 11/1914 | Wood | 346/5 |
| 1,928,809 | 10/1933 | Brunner | 346/5 |
| 2,040,082 | 5/1936 | De Juhasz | 346/5 |

FOREIGN PATENT DOCUMENTS

| | | | |
|---|---|---|---|
| 632506 | 1/1928 | France | 346/3 |
| 343912 | 2/1931 | United Kingdom | 346/4 |

Primary Examiner—George H. Miller, Jr.
Attorney, Agent, or Firm—Otto J. Munz

[57] ABSTRACT

An apparatus and method for recording the compression pressure of internal combustion engines, wherein a pair of recording elements, such as a stylus and a recording sheet, are movable relative to each other by a pressure sensitive element, and the compression pressure acts upon one of the recording elements to first move the recording element from a position of rest, after which the two recording elements are brought into contact with each other, and the pressure is then relieved from the one recording element, resulting in a line being drawn while the recording element returns to its position of rest.

17 Claims, 7 Drawing Figures

The method for recording the compression pressure of internal combustion engines, comprising in succession the steps:

> moving a stylus and a recording sheet relative to each other by a pressure-sensitive element;

> bringing the stylus and recording sheet into contact with each other during a part of the movement;

> subjecting the element to the compression pressure and pivoting one of the stylus and recording sheet from its position of rest into the maximum position determined by the compression pressure;

> bringing the stylus and recording sheet into mutual contact;

> relieving pressure from the element, whereby the deflected stylus or recording sheet is pivoted into its position of rest while producing a written line and > deflecting the recording sheet.

FIG. 5

The apparatus for recording the compression pressure of internal combustion engines, comprising the following means:

a recording sheet, a support for the recording sheet; a stylus mounted on and movable into contact with the recording sheet;

a recording arm and a pressure-sensitive element connected to move the support and the stylus relative to each other;

means for placing the stylus upon the recording sheet constructed in such a way that the stylus, at the deflection of one of the support and stylus, is lifted off from its position of rest and from the recording sheet and is movable under pressure, before the return of one of the support and the stylus to its initial position into contact with the recording sheet;

the support for the recording sheet comprising a Bourdon spring coupled with a segment mechanism having an output shaft on which the disc is mounted;

a key-shaped pin projecting from the center of the disc, with a circular recording sheet provided with a keyhole slid upon the pin;

a valve for the relief of the pressure-sensitive element coupled with the means for placing the stylus upon the recording sheet in such a way that the valve is switched, when the stylus is placed upon the recording sheet into a position of relief;

Fig. 6a the recording arm which supports the stylus being mounted on a rod displaceable coaxially to the stylus and against the force of a spring, said rod being provided with a curved-path slider whereon a pin that actuates the valve slides;

Stops provided at one end of the rod, which, when released, enable the stylus to be moved by the spring into a position that facilitates the placement of a recording sheet upon the support;

the recording arm being pivotable away from the support for the recording sheet for the purpose of placing the recording sheet thereon;

the stylus being displaceable on the recording arm into several recording positions;

the support being provided with annular elevations between the recording positions of the stylus, on which the recording sheet rests;

the stylus being resiliently mounted on the recording arm and perpendicarly to the plane of the recording sheet;

a window shield being arranged above the recording arm rigidly connected herewith, and a radially extending oblong hole being provided in the window shield, in which oblong hole the stylus is mounted in a longitudinally displaceable manner.

Fig. 6b

METHOD AND APPARATUS FOR RECORDING THE COMPRESSION PRESSURE OF INTERNAL COMBUSTION ENGINES

BACKGROUND OF THE INVENTION

1. Field of the Invention

The invention relates to a method and apparatus for recording the compression pressure of internal combustion engines, in which a stylus and a recording sheet are pressure-dependently moved relative to each other by a pressure-sensitive element, especially a Bourdon spring, and are brought into contact with each other during a part of the movement.

2. Prior Art

In a known method for recording the compression pressure, the stylus touching the recording sheet is pressure-dependently deflected during the compression process and thus draws a curve which ends at the maximum compression pressure attainable. To carry out this method, an apparatus is known which contains a Bourdon spring housed in a casing, which Bourdon spring can be connected, via a measuring line, with a spark plug aperture or an internal combustion engine, and a stylus is operatively connected with the Bourdon spring. In the casing, a support for the recording sheet is provided, the recording sheet and the support being stationary with respect to the casing. The stylus, which can be deflected by the Bourdon spring according to the pressure prevailing therein, is movable for the purpose of writing a line over the recording sheet. After the recording sheet has been clamped on the support, the stylus is made to rest on the recording sheet. When the stylus is subsequently deflected by the compression pressure, it writes the line on the recording sheet. Then the stylus is returned to its initial position by relief of the Bourdon spring.

Such known devices, generally called compression recorders, have hitherto been employed in two embodiments, namely, in one embodiment with a measuring range of about 2 to 12 kilopounds/square centimeter for Otto engines, and in another embodiment with a measuring range of about 10-40 kilopounds/square centimeter for Diesel engines. For testing the two engine types, it has been necessary to provide for two compression pressure recorders with different measuring ranges. Likewise, different recording sheets had to be employed for the two measuring ranges. This subdivision into two measuring ranges is necessary for reasons of recording accuracy. This is so because the friction of the stylus on the recording sheet during the compression process results, in connection with a single measuring range for both engine types, in an unacceptable recording incorrectness. With a measuring subdivision, this incorrectness can be reduced to 5%. This subdivision causes not only relatively large expenses when the compression pressure alternately of Diesel engines and Otto engines is to be recorded, but the recording itself is also more complicated since first of all the right compression recorder with the proper recording sheet must be provided

SUMMARY OF THE INVENTION

These disadvantages are eliminated by the invention, which has for its principal object the provision of a measuring method which permits the recording of compression pressures of Otto engines as well as Diesel engines, and possibly other engine types, with high accuracy in single measuring range.

This problem is solved according to the invention on the basis of the method initially described, by a structure wherein first, by having the compression presssure act upon the element, one of the two recording elements is pivoted from its position of rest into the maximum position determined by the compressions pressure, then the two recording elements are brought into mutual contact, and finally, by relieving the element, the deflected recording element is pivoted, while producing a written line, into its position of rest.

In this method of the invention, the measuring accuracy is substantially increased by the fact that during the defleciton of the pressure-sensitive element or the Bourdon spring, and the recording element operatively connected therewith, no friction between the two recording elements occurs. Only when the final deflection corresponding to the compression pressure is reached, but before the deflected recording element is returned to its initial position, are the two recording elements brought into contact with each other. In the resetting or return of the deflected recording element, a measuring curve is drawn. In this operation, the friction between the stylus and the recording sheet no longer affects the measuring accuracy to a relevant extent since the zero point of the recording sheet is fixed according to the initial position of the recording sheet support. In this manner a greater measuring accuracy than in the conventional method can be attained in a single measuring range which extends, e.g., from 1.5 bar to 50 bar.

In an advantageous embodiment of the invention, the recording sheet is pressure-dependently deflected. It is also in itself possible to deflect the stylus pressure-dependently and to arrange the recording sheet in a stationary manner, but this alternative is less favorable with regard to the manufacture of the apparatus.

A further concept of the invention relates to an apparatus for carrying out the method of the invention. The apparatus consists in a known manner of a support for the recording sheet, a stylus which can be applied to the recording sheet and is mounted on a recording arm, and a pressure-sensitive element, especially a Bourdon spring, by which the support and the stylus can be moved relative to each other. The apparatus differs from the conventional ones in that means for applying the stylus to the recording sheet are structured in such a way that the stylus, at the deflection of the support or stylus, is lifted off from its position of rest and from the recording sheet and is applied under pressure to the recording sheet before the return of the support or stylus into its initial position.

In a further development of the apparatus, the support for the recording sheet consists most suitably of a rotatably supported disc which is coupled with a pressure-sensitive element. In an apparatus with a Bourdon spring, this operative connection may advantageously be realized by having the Bourdon spring coupled with a segment mechanism on whose output shaft the disc is mounted. Such an embodiment presents a particularly compact structure. Moreover, the possibility exists of using structural components and parts of customary Bourdon spring manometers for the apparatus. For the fully satisfactory, nonrotatable fixation of the recording sheet on the disc it is most suitable that from the center thereof a key-shaped pin protrude, whereon a circular recording sheet provided with a keyhole aperture can be positioned.

In the last mentioned embodiment, at compact dimensions of the apparatus, a comparatively long deflecton path can be provided. The support of the recording sheet support, which is one of the decisive factors for the accuracy of the apparatus, can be precisely constructed as a rotatable support at a comparatively small expense. By the key-shaped pin, which engages the keyhole aperture of the circular measuring sheet, the recording sheet is accurately adjusted with respect to the recording sheet support.

In a suitable embodiment, the apparatus is constructed in such a way that a valve is provided for relieving the pressure sensitive element, which valve is coupled with the means for applying the stylus to the recording sheet in such a manner that the valve at the application of the stylus to the recording sheet is switched into a position of relief.

This further development is particularly suitable when the apparatus contains a Bourdon spring and includes a threaded nipple to be screwed into a threaded spark plug hole, so that the Bourdon spring is rigidly connected with the interior of the cylinder. In devices of the screwed-on type which have recording elements that are subject to contact, the return of the deflected recording element to its initial position is triggered by actuating the means for applying the stylus and thus relieving the Bourdon spring. Thereby, the deflected recording element is automatically returned by the spring force of the Bourdon spring to the initial position. The measuring result in this process is not vitiated by a gradual pressure drop in the Bourdon spring when the stylus is not yet firmly applied to the recording sheet.

A preferred embodiment of the apparatus with a recording sheet support capable of being deflected presents the characteristics that the recording arm carrying the stylus is mounted on a rod so as to be displaceable coaxially thereto and against the force of a spring, and is provided with a curved path slider whereon a pin actuating the valve slides.

The spring holds the recording arm, expect for the return of the deflected recording sheet support into its initial position, at such a distance from the recording sheet that the stylus does not reach the recording sheet. Moreover, the spring may, as will yet to be described, be provided for the purpose of pressing the recording arm still further away from the recording sheet support, so that the recording sheet can be conveniently placed upon the recording sheet support. For the automatic release of the return of the recording sheet support by pressing the stylus by means of the recording arm, the recording arm is coupled via a rod with the valve in order to switch the valve in the pressed-down position of the recording arm into its position of relief. For this purpose, the rod is provided with a curved-path slider which actuates the valve via the displaceable pin.

In a further development of the embodiment above described, the apparatus presents the characteristic that, stops are provided at one end of the rod, by whose release the recording arm can be moved via the spring into a position that facilitates the placing of a recording sheet.

For the placement of a recording sheet, the recording arm is therefore pressed particularly far away from the support, while, as long as the support is not to return to its initial position, it is normally held by the same spring at a shorter distance from the support. This construction of the apparatus allows a convenient handling and is compact and inexpensive.

A further improvement in the operation can be accomplished by the fact the recording arm can be pivoted away from the recording sheet support for the placement of the rcording sheet.

Preferably, the stylus is displaceable on the recording arm into several recording positions. Thereby, the compression pressure which are to be recorded for several cylinders of an engine and to be compared to each other, can be recorded on the recording sheet in an inexpensive way. For this purpose, after each measurement, the stylus is adjusted to a new recording line at another radial distance from the axis of rotation of the recording sheet report.

Preferably, the support is provided with annular elevations between the recording positions of the stylus on which elevations the recording sheets rests. By the elastic flexibility of the recording sheet between the annular elevations, the result is achieved that the stylus rests on the recording sheet when subjected to sufficient but not too high pressure.

In addition to, or also in place of, this structure, the stylus may suitably be supported on the recording arm perpendicularly to the recording sheet plane, in order to adjust the required recording pressure and to prevent a wedging of the stylus with respect to the recording sheet.

A further useful embodiment of the apparatus consists in that a window shield arranged above the recording arm is rigidly connected with the recording arm. By means of this compact construction the operation can also be made particularly convenient, since the return in this case is brought about by pressing-down any point of the window shield, thus requiring no great attention of the operator.

It is particularly advantageous to substitute the recording arm by a radially extending oblong hole arranged in the window shield, wherein the stylus is supported in a longitudinally displaceable manner. Such an embodiment offers, in addition to the aforementioned attendance advantages, also advantages with respect to manufacture.

The invention will be explained in greater detail below with the aid of the drawing, which contains a partly diagrammatical representation of an embodiment.

Figure 1:
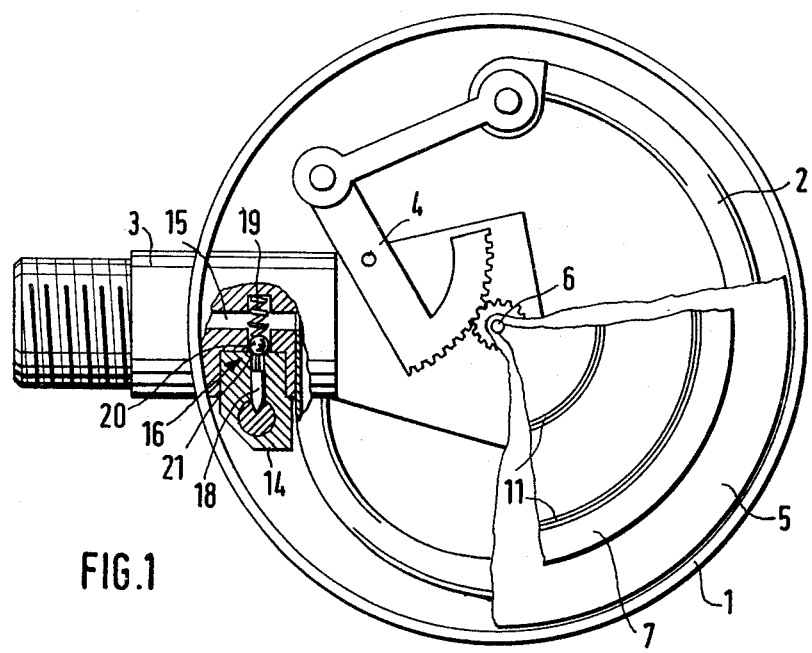
FIG. 1 is a plan view upon the apparatus with the cover and intermediate bottom removed.
Figure 2:
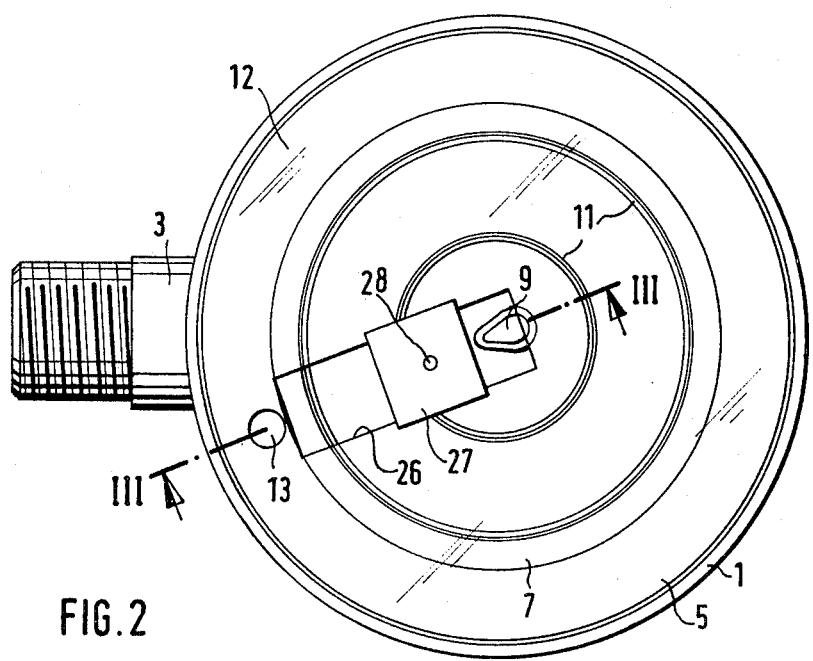
FIG. 2 is a plan view upon the apparatus of FIG. 1, with the cover put on and the intermediate bottom inserted.
Figure 3:
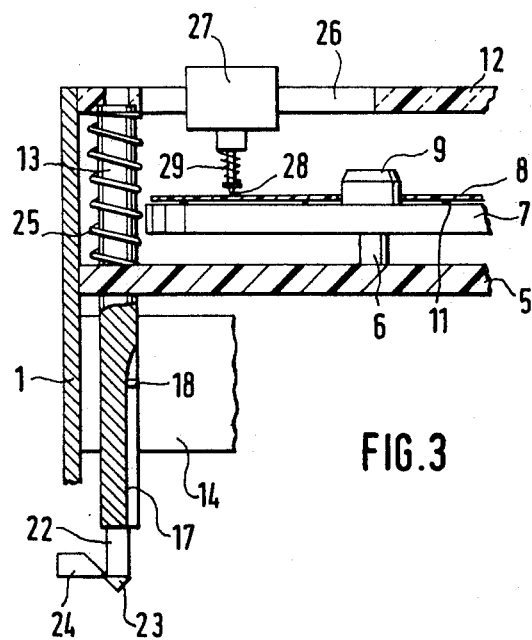
FIG. 3 is an enlarged section through the apparatus of FIG. 2 along line III—III.

FIGS. and 6a & b are block diagrams of method and apparatus of the invention.

DETAILED DESCRIPTION OF THE PREFERRED EMBODIMENTS

In a casing 1, a Bourdon spring 2 is provided which is soldered at one end to a pipe connection 3, and at its other end is operatively connected with a segment mechanism 4. Bourdon spring 2 and segment mechanism 4 are covered toward the front by an intermediate bottom 5. The output shaft 6 of segment mechanism 4 projects through the intermediate bottom 5 and a circular support 7 for the recording sheet 8 is mounted on the output shaft. On support 7 a key-shaped pin 9 is provided which corresponds with a corresponding keyhole aperture 10 in recording sheet 8.

Figure 4:
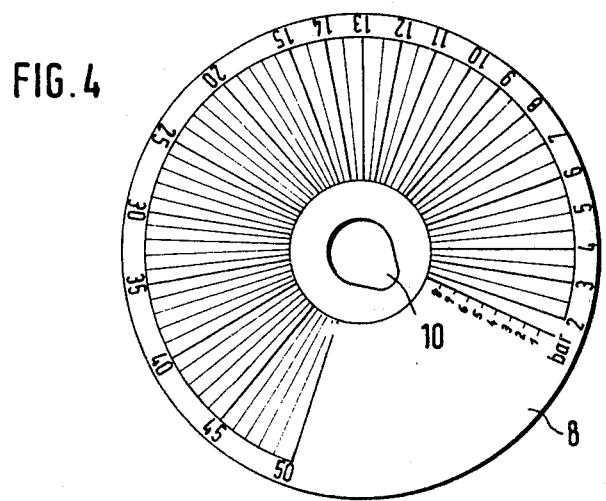
FIG. 4 is a plan view of a recording sheet provided in connection with the apparatus.

As shown in FIG. 4, recording sheet 8 is provided with radially directed lines of a scale of compression pressures, and markings at different radial distances for the individual cylinders whose compression pressures are to be measured. At a radial distance which extends between these markings for the cylinders, concentric annular elevations 11 project from support 7, on which elevations the recording sheet 8 rests.

Casing 1 is covered toward the front by a window shield 12 which is eccentrically fastened to a rod 13. Rod 13 is mounted, in an axially displaceable manner, in a support 14 at pipe connection 3 which contains the supply line 15 for Bourdon tube 2, as well as an air-relief valve 16. This air relief valve 16 is actuated via a curved-path slider 17 on rod 13. A displacable pin 18 is pressed against curved-path slider 17 by the force of a pressure spring 19. In this structure, a ball 20 is provided between the pin and the pressure spring, which ball is pressed by the pressure spring 19 in the position of rest against a flange 21 for the airtight sealing of the supply line at this location. In the relief position, ball 20 is lifted against the force of pressure spring 19 by pin 18 when rod 13 with curved-path slider 17 is shifted to the left.

The rod is provided with stops 23 at one end which include a displaceable latch 24 arranged perpendicularly to the rod. Between intermediate bottom 5 and window shield 12 a pressure spring 25 is provided which is mounted on rod 13 and holds window shield 12 in a normal position.

A radially extending oblong hole 25 is provided in window shield 12, wherein a support 27 for stylus 28 is displaceably mounted and held so as to rest in certain positions. By means of support 27, stylus 28 can be adjusted to various lines corresponding to the markings for the cylinders on the recording sheet 8. Stylus 28 is mounted on support 27 so as to be axially displaceable against the force of a spring 29.

For recording the compression pressure of a cylinder, a recording sheet is first laid on support 7. For this purpose, latch 24 of the stops is pulled toward the left, whereby window shield 12 with the stylus 28 is pressed, under the force of spring 25, far upward and can possibly be pivoted about the longitudinal axis of rod 13, so that the recording sheet can be easily laid down. Thereafter, window shield 12 is brought back into the drawn position where it is held by the stops.

Subsequently, the apparatus can, with interposition of a check valve (not shown), be secured to a spark plug aperture of an engine, so that by actuation of the starter of the engine, the air in the Bourdon spring is compressed via supply line 15 at closed valve 16. Thereby, the Bourdon spring deflects support 7, namely, into a position which corresponds to the compression pressure of this cylinder. During this rotation of support 7, stylus 28 is lifted off from recording sheet 8. When the terminal position which indicates the compression pressure is reached, stylus 28 is pressed down by pressure upon window shield 12, so that it resiliently abuts against the surface of reording sheet 8. In this position, pin 18 is simultaneously pressed toward the right, whereby ball 20 of valve 16 is brought into the position of relief. At the pressure drop which occurs as a result of this, the Bourdon spring turns support 7, due to the spring force of the Bourdon spring 7, back into the initial position. During this return movement, stylus 28 scratches a recording line which corresponds to the compression pressure into the wax surface of recording sheet 8.

When support 7 is returned, window shield 12 can be released again, so that stylus 28 is pressed up into the drawn position. Support 27 can then be adjusted so that stylus 28 assumes a new position for the next cylinder relative to the axis of the measuring mechanism. Thereafter, the compression pressure of the next cylinder can be recorded. The method for recording the compression pressure of internal combustion engines, comprises in succession the steps of:

moving a stylus and a recording sheet relative to each other by a pressure-sensitive element;

bringing the stylus and recording sheet into contact with each other during a part of the movement;

subjecting the element to the compression pressure and pivoting one of the stylus and recording sheet from its position of rest into the maximum position determined by the compression pressure;

bringing the stylus and recording sheet into mutual contact;

relieving pressure from the element, whereby the deflected stylus or recording sheet is pivoted into its position of rest while producing a written line and deflecting the recording sheet.

The apparatus for recording the compression pressure of internal combusion engines, comprises the following means:

a recording sheet, a support for the recording sheet; a stylus mounted on and movable into contact with the recording sheet;

a recording arm and a pressure-sensitive element connected to move the support and the stylus relative to each other;

means for placing the stylus upon the recording sheet constructed in such a way that the stylus, at the deflection of one of the support and stylus, is lifted off from its position of rest and from the recording sheet and is movable under pressure, before the return of one of the support and the stylus to its initial position into contact with the recording sheet;

the support for the recording sheet comprising a Bourdon spring coupled with a segment mechanism having an output shaft on which the disc is mounted;

a key-shaped pin projecting from the center of the disc, with a circular recording sheet provided with a keyhold slid upon the pin;

a valve for the relief of the pressure-sensitive element coupled with the means for placing the stylus upon the recording sheet in such a way that the valve is switched, when the stylus is placed upon the recording sheet into a position of relief;

the recording arm which supports the stylus being mounted on a rod displaceable coaxially to the stylus and against the force of a spring, said rod being provided with a curved-path slider whereon a pin that actuates the valve slides;

Stops provided at one end of the rod, which, when released, enable the stylus to be moved by the spring into a position that facilitates the placement of a recording sheet upon the support; the recording arm being pivotable away from the support for the recording sheet for the purpose of placing the recording sheet thereon;

the stylus being displaceable on the recording arm into several recording positions;

the support being provided with annular elevations between the recording positions of the stylus, on which the recording sheet rests;

the stylus being resiliently mounted on the recording arm and perpendicarly to the plane of the recording sheet;

a window shield being arranged above the recording arm rigidly connected herewith, and a radially extending oblong hole being provided in the window shield, in which oblong hole the stylus is mounted in a longitudinally displaceable manner.

By means of the apparatus described above, and within the provided measuring range of 1.5 to 50 bar., it is possible to reach grade 0.6 within the partial range of 1.5 to 15 bar. provided for gasoline engines and grade 1.0 within the partial range of 16 bar. to 50 bar. provided for Diesel engines, without special difficulties.

Therefore, by means of the compression pressure recorder of the invention, it is possible to carry out in an inexpensive way very accurate recordings of the compression pressure in gasoline and Diesel engines with a single apparatus.

What is claimed is:

1. Method for recording the compression pressure of internal combustion engines, comprising in succession the steps of:
    (A) Moving a stylus and a recording sheet relative to each other by a pressure-sensitive element,
    (B) bringing the stylus and recording sheet into contact with each other during a part of the movement;
    (C) subjecting the element to the compression pressure and pivoting one of the stylus and recording sheet from its position of rest into the maximum position determined by the compression pressure,
    (D) bringing the stylus and recording sheet into mutual contact,
    (E) relieving pressure from the element;
    (F) whereby the deflected stylus or recording sheet is pivoted into its position of rest while producing a written line.

2. The method as in claim 1, further comprising the step of deflecting the recording sheet.

3. Apparatus for recording the compression pressure of internal engines, comprising:
    (A) s recording sheet;
    (B) a support for the recording sheet;
    (C) a stylus mounted on and movable into contact with the recording sheet;
    (D) a recording arm and a pressure-sensitive element connected to move the support and the stylus relative to each other;
    (E) means for placing the stylus upon the recording sheet constructed in such a way that the stylus, at the deflection of one of the support and stylus is lifted off from its position of rest and from the recording sheet, and is movable under pressure at the maximum movement point into contact with the recording sheet, before the return of one of the support and the stylus to its initial position.

4. Apparatus as in claim 3, the recording arm being pivotable away from the support for the recording sheet for the purpose of placing the recording sheet thereon.

5. Apparatus as in claim 3, the stylus being resiliently mounted on the recording arm and perpendicularly to the recording sheet plane.

6. Apparatus as in claim 3, the stylus being displaceable on the recording arm into several recording positions.

7. Apparatus as in claim 6, the support being provided with annular elevations between the recording positions of the stylus, on which the recording sheet rests.

8. Apparatus as in claim 3, further comprising a window shield arranged above the recording arm rigidly connected therewith.

9. Apparatus as in claim 8, further comprising a radially extending oblong hole provided in the window shield, the stylus being mounted in said oblong hole in a longitudinally displaceable manner.

10. Apparatus as in claim 3, the support for the recording sheet comprising a rotatable disc coupled with the pressure-sensitive element.

11. Apparatus as in claim 10, the pressure sensitive element comprising a Bourdon spring coupled with a segment mechanism having an output shaft on which the disc is mounted.

12. Apparatus as in claim 10, further comprising a key-shaped pin projecting from the center of the disc with a circular recording sheet provided with a keyhole slid upon the pin.

13. Apparatus as in claim 3, further comprising a valve for the relief of the pressure-sensitive element, said valve being coupled with the means for placing the stylus upon the recording sheet in such a way that the valve is switched into a position of relief when the stylus is placed upon the recording sheet.

14. Apparatus as in claim 13, the recording arm which supports the stylus being mounted on a rod displaceable coaxially to the stylus and against the force of a spring, said rod being provided with a curved-path slider, whereon a pin, that actuates the valve, slides.

15. Apparatus as in claim 14, further comprising steps: at one end of the rod which, when released, enable the stylus to be moved by the spring into a position that facilitates the placement of a recording sheet upon the support.

16. The method for recording the compression pressure of internal combustion engines, comprising in succession the steps:
    moving a stylus and a recording sheet relative to each other by a pressure-sensitive element;
    bringing the stylus and recording sheet into contact with each other during a part of the movement;
    subjecting the element to the compression pressure and pivoting one of the stylus and recording sheet from its position of rest into the maximum position determined by the compression pressure;
    bringing the stylus and recording sheet into mutual contact;
    relieving pressure from the element, whereby the deflected stylus or recording sheet is pivoted into its position of rest while producing a written line and
    deflecting the recording sheet.

17. The apparatus for recording the compression pressure of internal combustion engines, comprising the following means:
    a recording sheet, a support for the recording sheet; a stylus mounted on and movable into contact with the recording sheet;
    a recording arm and a pressure-sensitive element connected to move the support and the stylus relative to each other;

means for placing the stylus upon the recording sheet constructed in such a way that the stylus, at the deflection of one of the support and stylus, is lifted off from its position of rest and from the recording sheet and is movable under pressure at the maximum movement point into contact with the recording sheet, before the return of one of the support and the stylus to its initial position;

the support for the recording sheet comprising a Bourdon spring coupled with a segment mechanism having an output shaft on which the disc is mounted;

a key-shaped pin projecting from the center of the disc, with a circular recording sheet provided with a keyhole slid upon the pin;

a valve for the relief of the pressure-sensitive element coupled with the means for placing the stylus upon the recording sheet in such a way that the valve is switched, when the stylus is placed upon the recording sheet into a position of relief;

the recording arm which supports the stylus being mounted on a rod displaceable coaxially to the stylus and against the force of a spring, said rod being provided with a curved-path slider whereon a pin that actuates the valve slides;

stops provided at one end of the rod, which, when released, enable the stylus to be moved by the spring into a position that facilitates the placement of a recording sheet upon the support;

the recording arm being pivotable away from the support for the recording sheet for the purpose of placing the recording sheet thereon;

the stylus being displaceable on the recording arm and perpendicularly to the plane of the recording sheet;

a window shield being arranged above the recording arm rigidly connected herewith, and a radially extending oblong hole being provided in the window shield, in which oblong hole the stylus is mounted in a longitudinally displaceable manner.

* * * * *